United States Patent [19]

Riccitiello et al.

[11] Patent Number: 5,130,278
[45] Date of Patent: Jul. 14, 1992

[54] BORON-CARBON-SILICON POLYMERS AND CERAMIC AND A PROCESS FOR THE PRODUCTION THEREOF

[75] Inventors: Salvatore Riccitiello; Ming-Ta Hsu; Timothy S. Chen, all of San Jose, Calif.

[73] Assignee: The United States of America as represented by the Administrator of the National Aeronautics and Space Administration, Washington, D.C.

[21] Appl. No.: 643,629

[22] Filed: Jan. 18, 1991

Related U.S. Application Data

[62] Division of Ser. No. 361,471, Jun. 5, 1989, Pat. No. 4,987,201.

[51] Int. Cl.$^5$ ............................................. C04B 35/56
[52] U.S. Cl. ...................................... 501/92; 501/93; 501/96; 501/97
[58] Field of Search .................. 501/91, 92, 93, 96, 501/97

[56] References Cited

U.S. PATENT DOCUMENTS

| | | | |
|---|---|---|---|
| 3,154,520 | 10/1964 | Dupont | 528/4 |
| 4,152,509 | 5/1979 | Yajima | 528/4 |
| 4,235,987 | 11/1980 | Peters | 528/5 |
| 4,604,367 | 8/1986 | Takamizawa et al. | 501/95 |
| 4,767,728 | 8/1988 | Riccitiello et al. | 501/91 |

OTHER PUBLICATIONS

E. C. Ashby, *Journal of the American Chemical Society*, vol. 81, p. 4791 (1959).
M. F. Hawthorne, *J. Org. Chem.* (1959), V. 23, p. 1788.
M. F. Hawthorne, *J. Amer. Chem. Soc. (1960), vol. 82, p. 748.*
H. Steinberg et al. (ed) (1964), *Progress in Boron Chemistry*, The MacMillan Company, New York, N.Y.
G. E. Legrow et al., American Ceramic Soc. Bulletin, (1987), vol. 66, 32, pp. 363-367.
R. J. Brotherton et al (ed) (1970), *Progress in Boron Chemistry*, vol. 3, Pergamon Press, New York, N.Y., p. 299.
K. J. Wynne et al. *Annual Reviews of Materials Science*, vol. 14, pp. 297-333 (1984).

R. W. Rice, *American Ceramic Society Bulletin*, vol. 66, p. 363 (1983).
M. S. Hsu et al., *Polymer Preprint*, vol. 27, #2, p. 261 (1986).

Primary Examiner—William R. Dixon, Jr.
Assistant Examiner—Anthony J. Green
Attorney, Agent, or Firm—Darrell G. Brekke; Guy Miller; John R. Manning

[57] ABSTRACT

The present invention relates to a process for the production of an organoborosilicon preceramic polymer of the structure:

$$(R^1)_x-Si(CH_2-CH_2)_{4-x}-(B)- \quad \text{or}$$

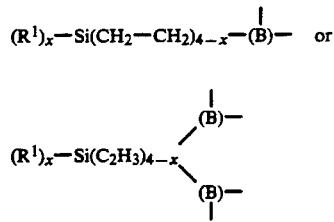

wherein $R^1$ is selected from alkyl having from 1 to 10 carbon atoms or phenyl, and x is selected from 0, 1, 2 or 3;

which is pyrolyzable to produce a refractory material comprising inorganic compounds of Si, C and B, which process comprises:

contacting a silicon containing compound of the structure:

$$(R^1)_x-Si-(CH=CH_2)_{4-x} \text{ or } (R^1)_x Si-(C\equiv CH)_{4-x}$$

with a boron containing compound selected from $H_3B:BH_3$, $H_3B:NH_3$, $BH_3:N(R^2)_3$ wherein $R_2$ is selected from methyl, ethyl, propyl, butyl or phenyl in an inert atmosphere at a temperature of between about 90° and 170° C. for between about 0.1 and 20 hr and recovering the prepolymer. The prepolymer is pyrolyzed to produce a ceramic article useful in high temperature (e.g., aerospace) or extreme environmental applications.

15 Claims, 2 Drawing Sheets

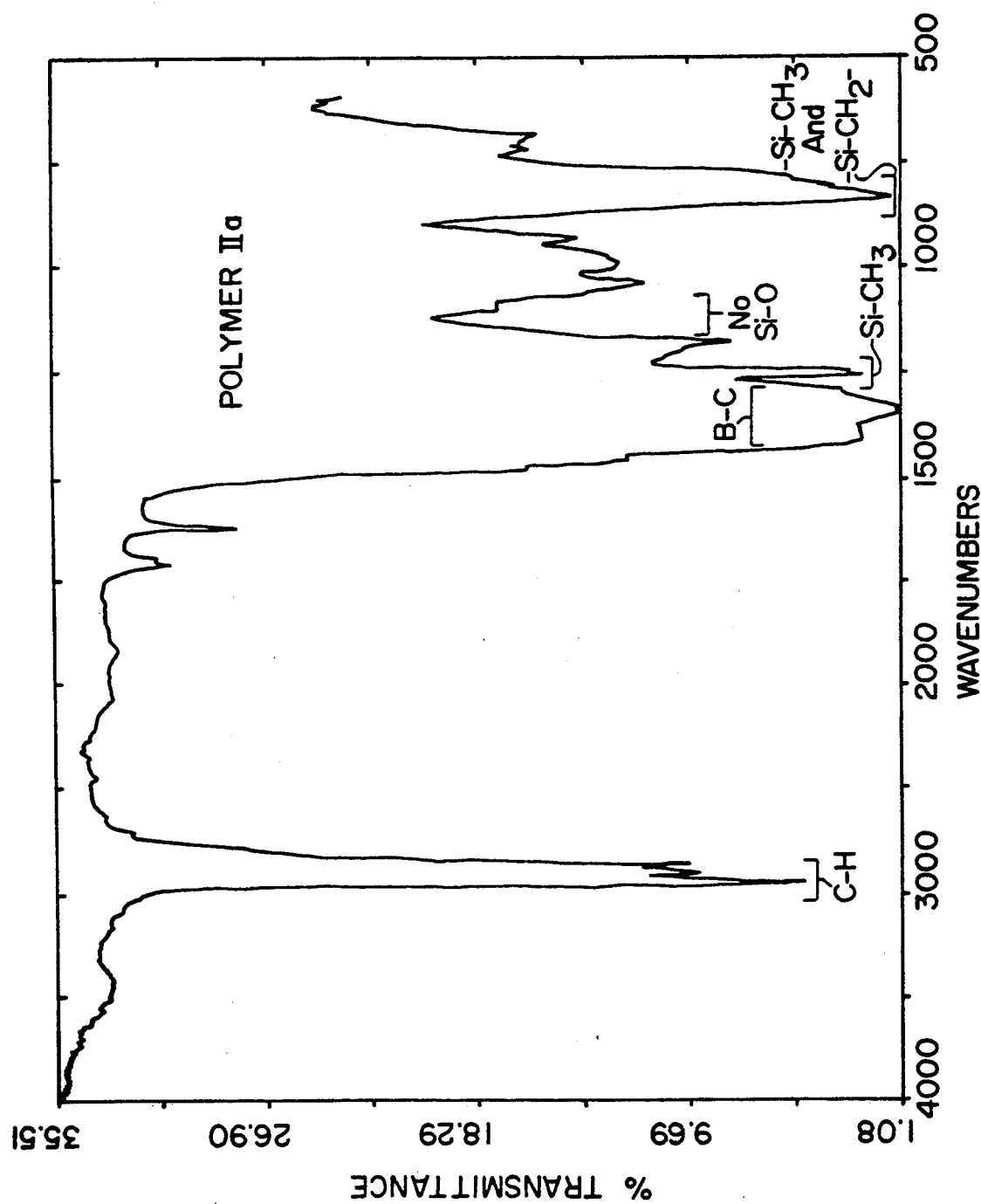
FIG._1.

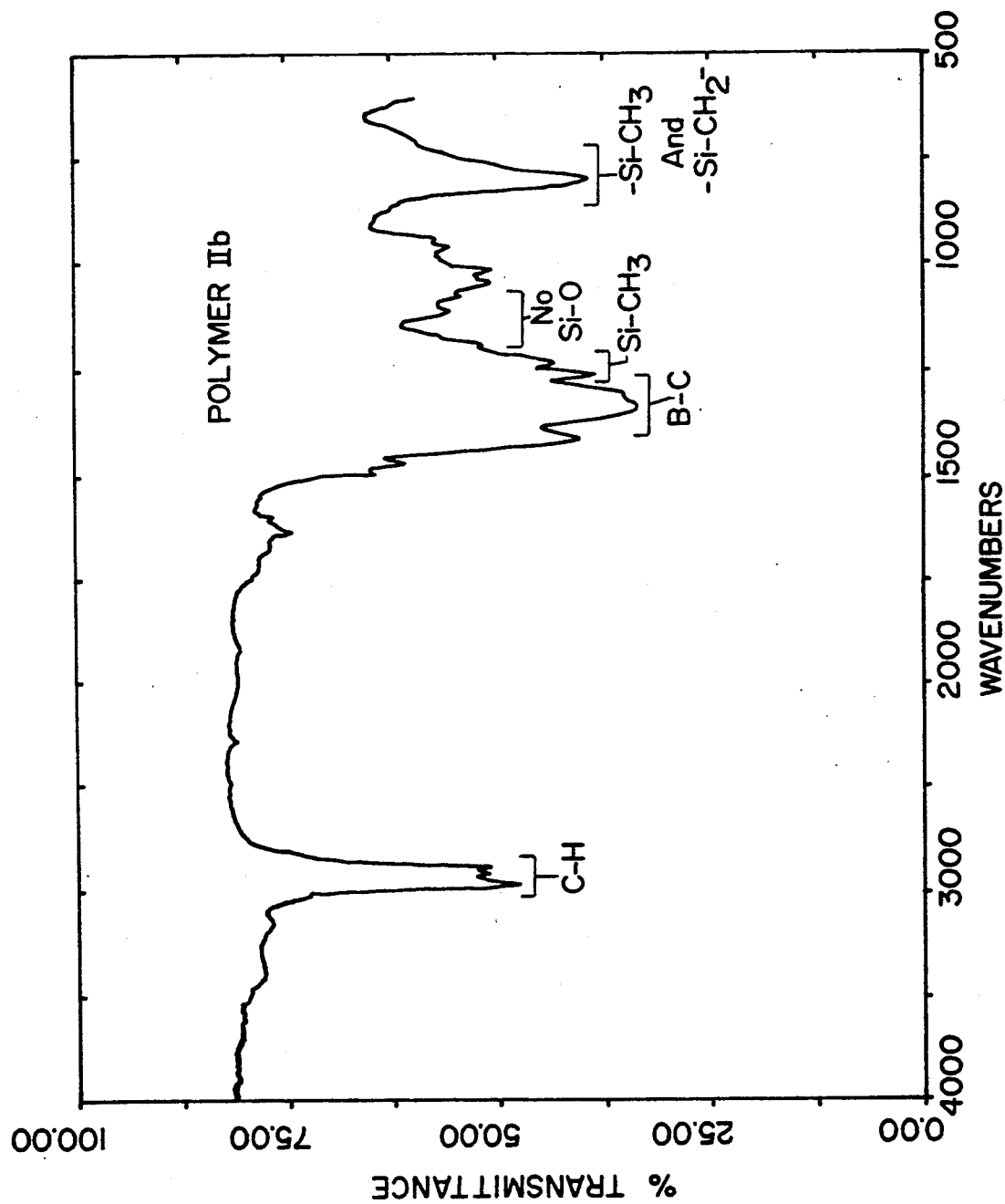
FIG._2.

BORON-CARBON-SILICON POLYMERS AND CERAMIC AND A PROCESS FOR THE PRODUCTION THEREOF

ORIGIN OF THE INVENTION

The invention disclosed herein was made in the performance of work under a NASA Contract and is subject to Public Law 96-517 (35 U.S.C. §200 et seq.). The contractor has not elected to retain title in this invention.

This application is a divisional application of the parent case, entitled "New Boron-Carbon-Silicon Polymers and the Ceramic Thereof", Ser. No. 361,471 filed on Jun. 5, 1989, currently issued as U.S. Pat. No. 4,987,201 on Jan. 22, 1991.

BACKGROUND OF THE INVENTION

1. Field of Invention

The present invention relates to the preparation of an organic-inorganic polymer comprising boron-carbon-silicon, the polymer itself and the ceramic produced by the pyrolysis of the polymer.

2. Description of Related Art

Ceramics are prepared by pyrolysis of various organosilicon polymers. A general discussion of the history of the field is found in K. J. Wynne, et al., *Annual Reviews of Materials Science* (1984), Vol. 14, p. 297; R. W. Rice, *American Ceramic Society Bulletin* (1983), Vol. 62, p. 889; and in G. E. Legrow, et al. (1987) *American Ceramic Society Bulletin*, Vol 66, p. 363. More recently, M. S. Hsu, et al., in *Polymer Preprint* (1986), Vol. 27, #2, p. 261, disclose a number of organic silicon-boron polymer compounds that produce refractory materials upon degradation. An organo-silicon polymer containing boron may improve the properties of the polymer and the ceramic product.

It is reported by E. C. Ashby, *Journal of the American Chemical Society* (1959), Vol. 81, p. 4791 and by M. F. Hawthorne, *Journal of Organic Chemistry* (1959), Vol. 23, p. 1788, that diborane ($H_3B:BH_3$) and a borane:amine complex react with organic olefin compounds to form saturated addition products:

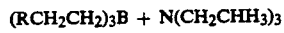

R is an organic group in this reference. However, no polymer was synthesized from this reaction.

Amine adducts of borane are reported to be useful in the hydroborane reaction. For example, M. F. Hawthorne, *Journal of the Chemical Society* (1960), Vol. 82, p. 748; and H. Steinberg, et al. (Ed.) *Progress in Boron Chemistry*, Vol. 1, the MacMillan Company, New York, N.Y., 1964, report the complex trimethylamine-t-butylborane reacts rapidly with olefin near 50° C. to produce t-butyl dialkylboron compounds or heterocyclic boron compounds.

U.S. Patents of interest include J. A. Dupont, et al., U.S. Pat. No. 3,154,520; S. R. Riccitiello, et al., U.S. Pat. No. 4,767,728; S. Yajima, et al., U.S. Pat. No. 4,152,509; and E. N. Peters, U.S. Pat. No. 4,235,987.

All references and patents cited herein are incorporated by reference in their entirety.

None of the above references disclose or suggest the polymer precursors, the polyorganoborosilicon or silicon-boron ceramic polymers of the present invention.

It is highly desirable to have polymer precursors for -Si-B-C-ceramic materials that are formed from readily available and relatively inexpensive starting materials and in high yield. Additional desirable properties include stability at room temperature for prolonged periods of time, and high yield of ceramic material upon pyrolysis. The present invention provides such useful silicon-carbon-boron ceramic materials.

SUMMARY OF THE INVENTION

The present invention relates to a process for the production of an organoborosilicon preceramic polymer of the structure:

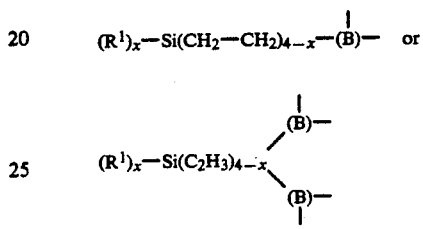

wherein $R^1$ selected from alkyl having 1 to 10 carbon atoms or phenyl, and x is selected from 0, 1, 2 or 3, which is pyrolyzable to produce a refractory material comprising inorganic compounds of Si, C and B, which process comprises contacting a silicon containing compound of the structure:

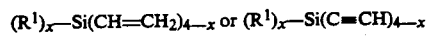

with a boron containing compound selected from

wherein group $R^2$ is independently selected from methyl, ethyl, propyl, butyl or phenyl, with the proviso that the entire group $N(R^2)_3$ of compound $BH_3:N(R^2)_3$ may also be selected from pyridine, quinoline or alkyl substituted quinoline, in an inert anhydrous atmosphere at a temperature of between about 90° and 170° C. for between about 0.1 and 120 hr.

The ceramic silicon-boron-carbon compounds of the present invention are useful in high temperature (e.g., aerospace) applications. The ceramic is useful to infiltrate other ceramic structures to produce a composite having higher temperature and oxidation-resistant properties. The organic preceramic polymer is decomposed in a closed system to deposit particles on a substrate. Alternatively, the organic polymer is shaped into an article form and pyrolyzed to produce the ceramic in article form which has high temperature useful properties, including oxidation resistance.

BRIEF DESCRIPTION OF THE DRAWINGS

FIG. 1 shows the infrared spectrum of polymer IIa formed by the reaction of dimethyldivinyl silane and the borane-triethylamine complex.

FIG. 2 shows the infrared spectrum of polymer IIb formed by the reaction of trivinylmethylsilane and borane-ammonia complex.

DETAILED DESCRIPTION OF THE INVENTION AND PREFERRED EMBODIMENTS

In the present invention, a new type of boron-carbon-silicon polymer is prepared by the reaction of vinylsilane or vinylmethylsilanes (acetylene)silane or acetylene alkyl silanes and borane or borane derivatives.

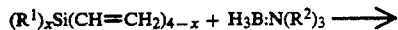

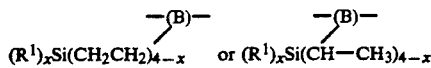

or

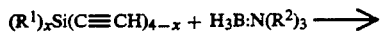

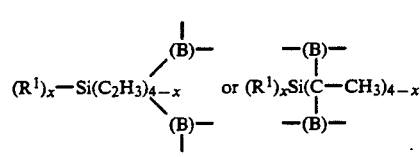

where $R^1$ is methyl, ethyl, hexyl, propyl, decyl or phenyl; $x=0$, 1 or 2, $R^2=H$, methyl, ethyl, propyl, butyl, phenyl, t-butyl, etc. The $:N(R^2)_3$ is also selected from aryl amines such as pyridine alkyl substituted pyridine, quinoline or alkyl substituted quinoline. In the present invention the precursor organic polymer is produced by combining under anhydrous conditions a silicon compound having at least one carbon double or triple bond with a boron-nitrogen complex. Typical reagents are described hereinabove. The reagents are contacted neat or in inorganic aprotic solvent such as acetonitrile, tetrahydrofuran, hydrocarbons or mixtures thereof.

The reagents are combined in an inert atmosphere and are heated from between about 0.1 and 120 hr. preferably between about 2 and 48 hrs. at between about 90° and 170° C., preferably between about 100° and 140° C. the solvent, when present, is removed. The organic polymer produced is usually sensitive to water, and needs to be protected from any moisture.

The organic preceramic polymer is then polymerized at between about 100° and 1500° C., preferably between about 100° and 1100° C. and more preferably between about 100° and 700° C.

The reaction of borane and vinylsilane(s) gives various products depending on the starting material. Polymers give high yield of ceramic material upon pyrolysis.

Table 1 shows the elemental analysis of the organic silicon-carbon-boron compounds. Surprisingly, nitrogen appears in those compounds where boron-ammonia compounds are precursors.

TABLE 1
ELEMENTAL ANALYSIS OF Si—C—B ORGANIC POLYMERS

| Sample | % of Element | | | | |
|---|---|---|---|---|---|
| | C | H | B | Si | N |
| Polymer Ia | | | | | |
| Theoretical | 62.07 | 10.34 | 9.48 | 18.10 | |
| Found | 62.75 | 10.36 | 8.79 | 15.65 | 1.35 |
| Ceramic Product | | | | | |
| Found | 54.01 | 0.35 | 11.14 | 24.67 | <0.10 |

TABLE 1-continued
ELEMENTAL ANALYSIS OF Si—C—B ORGANIC POLYMERS

| Sample | % of Element | | | | |
|---|---|---|---|---|---|
| | C | H | B | Si | N |
| Polymer Ib | | | | | |
| Theoretical | 62.07 | 10.34 | 9.48 | 19.1 | |
| Found | 55.46 | 7.80 | 8.14 | 15.25 | 7.21 |
| Ceramic Product | | | | | |
| Found | 46.21 | 0.32 | 11.69 | 21.76 | 10.39 |
| Polymer IIa | | | | | |
| Theoretical | 60.87 | 10.87 | 7.97 | 20.28 | |
| Found | 58.65 | 10.45 | 7.67 | 16.34 | 0.49 |
| Ceramic Product | | | | | |
| Found | 52.95 | 0.13 | 10.34 | 29.14 | <0.10 |
| Polymer IIb | | | | | |
| Theoretical | 60.87 | 10.87 | 7.97 | 20.28 | |
| Found | 45.46 | 8.17 | 12.84 | 15.53 | 9.80 |
| Polymer IIIa | | | | | |
| Theoretical | 59.34 | 11.54 | 6.05 | 23.07 | |
| Found | 52.68 | 10.41 | 4.53 | 19.85 | 0.14 |
| Polymer IIIb | | | | | |
| Ceramic Product | — | | | | |
| Found | | 0.20 | 19.09 | 16.72 | 7.18 |
| Polymer IVa | | | | | |
| Theoretical | 55.90 | 11.18 | 6.83 | 26.09 | |
| Found | 55.11 | 11.12 | 6.70 | 26.04 | 0.071 |

Table 2 shows the thermal decomposition of the organic silicon-carbon-boron polymers in argon up to 1000° C. and the weight precent of ceramic yield.

Table 3 describes the reactants used to form the various precursor polymers and also the ceramics.

TABLE 2
THERMAL DECOMPOSITION OF Si—C—B POLYMERS IN ARGON (TGA)

| Sample # | Temperature Decomposition (°C.) | % of Ceramic Yield at 1000° C. |
|---|---|---|
| Polymer Ia | 200–700 | 60–64% |
| Polymer Ib | 400–500 | 78% |
| Polymer IIa | 300–700 | 46% |
| Polymer IIb | 200–600 | 47% |
| Polymer IIIa | 110–550 | 7–10% |
| Polymer IIIb | 100–550 | 30–35% |
| Polymer IVa | 200–600 | 14% |
| Polymer IVb | 200–600 | 36% |

TABLE 3

| Polymer # | Reactants |
|---|---|
| Ia | Tetravinylsilane + $H_3B:N(CH_2CH_3)_3$ |
| Ib | Tetravinylsilane + $H_3B:NH_3$ |
| Ic | Tetravinylsilane + $H_3B:BH_3$ |
| IIa | Trivinylmethylsilane + $H_3B:N(CH_2CH_3)_3$ |
| IIb | Trivinylmethylsilane + $H_3B:NH_3$ |
| IIIa | Divinyldimethylsilane + $H_3B:N(CH_2CH_3)_3$ |
| IIIb | Divinyldimethylsilane + $H_3B:NH_3$ |
| IVa | Trimethylsilylacetylene + $H_3B:N(CH_2CH_3)_3$ |
| IVb | Trimethylsilylacetylene + $H_3B:NH_3$ |

From Tables 1, 2 and 3, a number of observations are made.

When borane is used, as expected, little nitrogen is found in the organic preceramic polymer, or in the ceramic obtained after pyrolysis.

When borane and a dialkyl amine complex is used in the preparation of the preceramic organic polymer, a small amount of nitrogen from the amine is found in the elemental analysis of the organic polymer.

Borane and ammonia are postulated to react with each other to form borazine (also known as borazole):

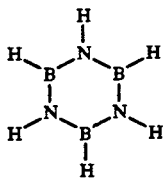

(See, for example), R. J. Brotherton, et al. (ed), *Progress in Boron Chemistry*, (1970), p. 229, Vol. III, Pergamon Press, New York, N.Y. Once formed, borazine will react with unsaturated carbon-carbon bonds (olefin and acetylenic) in the silicon compounds to produce an organic preceramic polymer containing boron and nitrogen. Borazine will form ceramic compounds, e.g. BN, upon thermal degradation. In the infared spectrum, the B-N stretching frequency merges with the frequency of the B-C bond (about 1350 cm$^{-1}$).

The present invention discloses a method to prepare novel organic boron-silicon polymers (having a molecular weight of between about 500 to 100,000 daltons, preferably 1,000 to 50,000 daltons, especially between about 2,000 and 20,000 daltons). The polymers are pyrolyzed to a silicon-carbon boron ceramic having improved high temperature and oxidation properties. The ceramics are useful in aerospace materials application.

In one embodiment of the present invention, the ceramic formed comprises of ceramic compounds components selected from $B_4C$, SiB, SiC, on $Si_xB_yC_z$ wherein x is between about 0.5 and 1.2, y is between about 0.5 and 1.5, and z is between about 3 and 6, or combination of these ceramics.

In another embodiment of the present invention, the ceramic formed comprises of ceramic compounds components selected from $B_4C$, SiB, SiC, CB, on $Si_aB_bC_c$ wherein a is between about 0.6 and 1.0, b is between about 0.6 and 1.5 and c is between about 3 and 6 or combinations (mixtures) of these ceramics.

In yet another embodiment of the present invention, the ceramic formed comprises of ceramic compounds components selected from $B_4C$, SiB, SiC, BN, $Si_3N_4$, $Si_mB_nC_c$, $Si_pB_nC_cN_q$ on $Si_pB_nN_c$, wherein c is between about 3 and 6, m is between about 0.5 and 1, n is between about 0.8 and 1.5, p is between about 0.8 and 1.5, and q is between about 0.6 and 1.2, or mixtures or combinations of these ceramics.

Usually the individual compounds of the novel ceramic are each independently present in between about 0.1 and 80% by weight, preferably between about 1 and 60% by weight.

The following Examples are disclosed to be illustrative and exemplary only. They are not to be construed as being limiting in any way.

General - Diborane is obtained from Matheson Gas Products, Inc. of Newark, Calif. Borane: ammonia and borane: amine derivatives were obtained from Alpha Products. Vinyl silanes and silylacetylene are obtained from Huls America Incorporated. All other chemicals were from Aldrich Chemical Co., Milwaukee, Wis. All reagents or solvents are obtained dry or are pretreated using conventional methods to remove any moisture present. Infrared spectra were recorded on a Nicolet MX-1 Fourier Transform InfraRed (FTIR). A Varian EM360 Nuclear Magnetic Resonance (NMR) spectrometer was used for NMR spectra. A DuPont 1090 thermal analyzer was used for thermogravimetric analysis. Molecular weights of the polymers were measured by the conventional vapor-pressure-osmometry method in chloroform, using Wescan Molecular Apparatus Model 233-200. X-ray defraction (XRD) measurements are obtained using a conventional General Electric Company X-ray defractometer.

EXAMPLE 1

REACTION OF TETRAVINYLSILANE AND BORANE-TRIETHYLAMINE

(a) Tetravinylsilane (0.075 mole) and boranetriethylamine (0.1 mole) are heated at 145° C. for 2 hr in an inert atmosphere. The triethylamine is removed under vacuum, (1 to 10 torr) and a white solid is produced. The TGA curve of the white solid shows 63% ceramic yield in argon.

EXAMPLE 2

REACTION OF BORANE-AMMONIA AND TETRAVINYLSILANE

(a) Liquid tetravinylsilane (0.1 mole) and solid borane-ammonia (0.134 mole) are reacted at 90°–105° C. in an inert atmosphere without using any solvent for 2 hr. Ammonia evolves at about 90° C. and the reaction is continued for 20 hr. at 135° C. The reaction mixture becomes a white solid.

EXAMPLE 3

CERAMIC PRODUCTION (a) The organoboronsilicon compound of Example 2 is pyrolyzed at a heating rate of 10°–20° C./min up to 1000°–1100° C. and is held at 1000 for 1 hr. in an atmosphere of nitrogen or argon. A ceramic yield of 78% is obtained.

EXAMPLE 4

REACTION OF DIBORANE AND TETRAVINYLSILANE

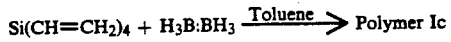

(a) The reaction of diborane and tetravinylsilane in toluene is performed by reacting tetravinylsilane (1 mole) in toluene with diborane gas (1.2 mole) for 72 hr. at 100°–110° C. After removing the solvent under vacuum, a yellowish solid material is obtained. The dried solid gives a 64% ceramic yield. The IR spectrum of the solid shows small -OH bands, but no B-H band.

(b) Polymer Ia is also prepared by the reaction of tetravinylsilane and borane in the tetrahydrofuran complex. The time of reaction is longer, of the order of about three days.

EXAMPLE 5

CERAMIC PRODUCTION (a) The organoboronsilicon compound of Example 1 is pyrolyzed at a temperature of 1000° C. for 1 hr. in an atmosphere of nitrogen or argon. A ceramic yield of about 60-64 is obtained.

EXAMPLE 6

REACTION OF TRIVINYLMETHYLSILANE AND BORANE-TRIETHYLAMINE

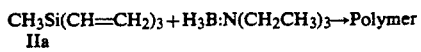
Polymer IIa (a) Trivinylmethylsilane (0.1 mole) and borane-triethylamine (0.1 mole) are reacted at 130° C. in an inert atmosphere. After heating at 130° C. for 1 hr, the sample solidifies. Triethylamine is removed under vacuum. The product is a yellowish polymer which is not soluble in organic solvents, such as toluene or chloroform. The TGA of the polymer in argon shows 46% ceramic yield.

EXAMPLE 7

REACTION OF TRIVINYLMETHYLSILANE AND BORANE-AMMONIA

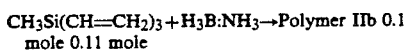
Polymer IIb
0.1 mole 0.11 mole (a) Trivinylmethylsilane (0.1 mole) and boron:ammonia complex (0.11 mole) are reacted at 140° C. for 24 hrs. in an inert atmosphere of argon. A white solid was obtained. The white solid gave 47% ceramic product at 1000°-1100° C. in an inert atmosphere of argon.

EXAMPLE 8

REACTION OF DIVINYLDIMETHYLSILANE AND BORANE:TRIETHYLAMINE

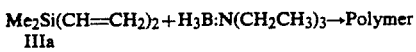
Polymer IIIa (a) Divinyldimethylsilane (0.15 mole) and borane-triethylamine (0.1 mole) are reacted in an inert atmosphere at 130°-150° C. for 20 hr. Triethylamine and unreacted starting material are removed by vacuum distillation at 100° C. The product is a viscous liquid which contains no vinyl group shown by the NMR spectrum. The infrared spectrum of the product shows a small B-H band at 2400 cm$^{-1}$ and a large B-C band at 1300 cm$^{-1}$. The TGA curve of the viscous product shows only 7-10% ceramic yield at 1000° C. in argon. The product may be a compound of:

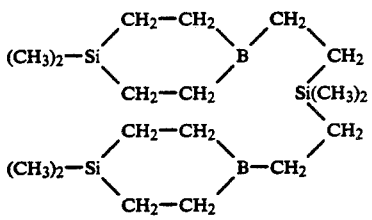

EXAMPLE 9

REACTION OF DIVINYLDIMETHYLSILANE AND BORANE-AMMONIA

Polymer IIIb (a) Divinyldimethylsilane (0.08 mole) and borane-ammonia (0.08 mole in excess) are reacted at 120° C. in an inert atmosphere for 3 hours. After the ammonia is evolved, the product turns to a solid. The TGA of the material in argon gives 32% ceramic yield. Polymer IIb is partially soluble in chloroform and acetone and produces some white insoluble solid.

EXAMPLE 10

REACTION OF TRIMETHYLSILYACETYLENE AND BORANE-TRIETHYLAMINE

Polymer VIa

A mixture of trimethylsilylacetylene (5 g, 0.051 mole) and borane:triethylamine complex (3.91 g, 0.034 mole) is heated at 130°-150° C. for 18-48 hr. in an inert atmosphere. The mixture is the distilled under vacuum (1 mm.) at 150° C. to remove volatile materials. An amber solid is obtained. The TGA of the solid in argon gives a 14% ceramic yield.

EXAMPLE 11

REACTION OF TRIMETHYLSILYLACETYLENE AND BORANE:AMMONIA

polymer IVb.

Trimethylsilylacetylene (0.068 mole) and borane:ammonia (0.045 mole) are heated at 130°-150° C. for 24 hr. in an inert atmosphere. The mixture is then heated at 150° C. under vaccum (1 mm) to remove any volatile materials. The resulting solid gives 36% ceramic yield at 1000° C. in argon.

While only a few embodiments of the invention have been shown and described herein, it will become apparent to those skilled in the art that various modifications and changes can be made in the process to prepare new boron-carbon-silicon polymers and the polymers thereof and the ceramic material produced upon pyrolysis of these preceramic polymers without departing from the spirit and scope of the present invention. All such modifications and changes coming within the scope of the appended claims are intended to be carried out thereby.

We claim:

1. A process for the production of a ceramic material consisting essentially of ceramic compounds of silicon, boron, and carbon, which process comprises:

(a) producing an organoborosilicon ceramic prepolymer of the structure:

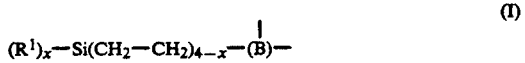

wherein $R^1$ is selected from alkyl having from 1 to 10 carbon atoms or phenyl, and x is selected from 0, 1, 2 or 3, which prepolymer is pyrolyzable to produce a refractory material consisting essentially of ceramic compounds of silicon, carbon and boron by;

(i) contacting a silicon containing compound of the structure: $(R^1)_x$—Si $(CH=CH_2)_{4-x}$
with a boron containing compound selected from $H_3B:BH_3$, $H_3B:NH_3$, $H_3B:N(R^2)_3$ wherein $R^2$ is selected from methyl, ethyl, propyl, butyl or phenyl, in an inert anhydrous atmosphere at a temperature of between about 90° and 170° C. for between about 0.1 and 120 hr; and (ii) recovering the ceramic prepolymer of structure I; and (b) heating the prepolymer formed in step (ii) in an inert atmosphere at a temperature of between about 500° and 1500° C. for between about 0.1 and 3 hr to obtain the silicon-boron-carbon ceramic material.

2. The process of claim 1 wherein in the silicon containing compound, x is 0 and the boron containing compound is H$_3$B:BH$_3$.

3. The process of claim 1 wherein in the silicon containing compound, x is 0, and the boron containing compound is H$_3$B:NH$_3$, with the proviso that when H$_3$B:NH$_3$ is used, nitrogen remains in the organoborosilicon ceramic prepolymer in between about 1.5 and 13 percent by weight.

4. The process of claim 1 wherein in the silicon containing compound, R$^1$ is methyl, x is 2, and the boron containing compound is H$_3$B:N(R$^2$)$_3$.

5. The process of claim 1 for preparation of ceramic material consisting essentially of ceramic compounds of silicon, boron, and carbon, wherein said ceramic material includes one or more ceramic compounds selected from B$_4$C, SiB, SiC, or Si$_x$B$_y$C$_z$, wherein x is between about 0.5 and 1.2, y is between about 0.5 and 1.5, and z is between about 3 and 6.

6. The process of claim 1 for preparation of ceramic material consisting essentially of ceramic compounds of silicon, boron, and carbon wherein said ceramic material includes one or more ceramic compounds selected from B$_4$C, SiB, SiC, CB, or Si$_a$B$_b$C$_c$, wherein a is between about 0.6 and 1.0, b is between about 0.6 and 1.5, and c is between about 3 and 6.

7. The process of claim 1 for preparation of ceramic material consisting essentially of ceramic compounds of silicon, boron, and carbon, wherein said ceramic material includes one or more ceramic compounds selected from B$_4$C, SiB, SiC, BN, Si$_3$N$_4$, Si$_m$B$_n$C$_c$, Si$_p$B$_n$C$_c$N$_q$ or, Si$_p$B$_n$N$_c$, wherein c is between about 3 and 6, m is between about 0.5 and 1, n is between about 0.8 and 1.5, p is between about 0.8 and 1.5, and q is between about 0.6 and 1.2.

8. A process for the production of a ceramic material consisting essentially of ceramic compounds of silicon, boron, and carbon, which process comprises:

(a) producing an organoborosilicon ceramic prepolymer of the structure:

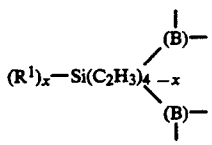

(II)

wherein R$^1$ is selected from alkyl having from 1 to 10 carbon atoms or phenyl, and x is selected from 0, 1, 2 or 3, which prepolymer is pyrolyzable to produce a refractory material consisting essentially of ceramic compounds of silicon, carbon, and boron by;

(i) contacting a silicon containing compound of the structure:

(R$^1$)$_x$—Si (C≡CH)$_{4-x}$ with a boron containing compound selected from H$_3$B:BH$_3$; H$_3$B:NH$_3$, or BH$_3$:N(R$^2$)$_3$, wherein R$^2$ is selected from methyl, ethyl, propyl, butyl, or phenyl in an inert anhydrous atmosphere at a temperature of between about 90° and 170° C. for between about 0.1 and 120 hr; and (ii) recovering the ceramic prepolymer of structure (II); and (b) heating the prepolymer formed in step (ii) in an inert atmosphere at a temperature of between about 500° and 1500° C. for between about 0.1 and 3 hr to obtain the silicon-boron-carbon ceramic material.

9. The process of claim 8 wherein in the silicon containing compound, x is 0 and the boron containing compound is H$_3$B:BH$_3$.

10. The process of claim 8 wherein in the silicon containing compound, x is 0, and the boron containing compound is H$_3$B:NH$_3$, with the proviso that when H$_3$B:NH$_3$ is used, nitrogen remains in the organoborosilicon ceramic prepolymer in between about 1.5 and 13 percent by weight.

11. The process of claim 1 wherein in the silicon containing compound, R$^1$ is methyl, x is 2, and the boron containing compound is H$_3$B:N(R$^2$)$_3$.

12. The process of claim 1 wherein the molecular weight of the prepolymer in step (c) is between about 500 and 100,000 daltons.

13. The process of claim 8 for preparation of ceramic material consisting essentially of ceramic compounds of silicon, boron, and carbon, wherein said ceramic material includes one or more ceramic compounds selected from B$_4$C, SiB, SiC, or Si$_x$B$_y$C$_z$, wherein x is between about 0.5 and 1.2, y is between about 0.5 and 1.5, and z is between about 3 and 6.

14. The process of claim 8 for preparation of ceramic material consisting essentially of ceramic compounds of silicon, boron, and carbon, wherein said ceramic material includes one or more ceramic compounds selected from B$_4$C, SiB, SiC, CB, or Si$_a$B$_b$C$_c$, wherein a is between about 0.6 and 1.0, b is between about 0.6 and 1.5, and c is between about 3 and 6.

15. The process of claim 8 for preparation of ceramic material consisting essentially of ceramic compounds of silicon, boron, and carbon, wherein said ceramic material includes one or more ceramic compounds selected from B$_4$C, SiB, SiC, BN, Si$_3$N$_4$, Si$_m$B$_n$C$_c$, Si$_p$B$_n$C$_c$N$_q$, or Si$_p$B$_n$N$_c$, wherein c is between about 3 and 6, m is between about 0.5 and 1, n is between about 0.8 and 1.5, p is between about 0.8 and 1.5, and q is between about 0.6 and 1.2.

* * * * *